United States Patent [19]

Reilly

[11] Patent Number: 4,760,373
[45] Date of Patent: Jul. 26, 1988

[54] MOTORCYCLE HELMET CONTAINING AN AUTOMATIC BRAKE LIGHT

[76] Inventor: Richard M. Reilly, 31 Norwood Dr., Blue Point, N.Y. 11715

[21] Appl. No.: 893,995

[22] Filed: Aug. 7, 1986

[51] Int. Cl.$^4$ ............................................. B62J 6/00
[52] U.S. Cl. ................................... 340/134; 362/106; 362/72; 200/43.19
[58] Field of Search ................. 340/134, 87, 321, 539, 340/825.31; 362/105, 106, 72; 2/6; 455/99; 200/43.16, 43.18, 43.19, 43.21

[56] References Cited

U.S. PATENT DOCUMENTS

| | | | |
|---|---|---|---|
| 2,832,857 | 4/1958 | Landmeier | 200/43.19 |
| 3,835,454 | 9/1974 | Palmieri et al. | 340/825.73 X |
| 4,134,108 | 1/1979 | Palmer et al. | 340/539 |
| 4,191,948 | 3/1980 | Stockdale | 340/539 |
| 4,288,780 | 9/1981 | Theodoru et al. | 340/825.31 X |
| 4,396,914 | 8/1983 | Aston | 340/825.31 |
| 4,559,516 | 12/1985 | Schott et al. | 340/134 X |

FOREIGN PATENT DOCUMENTS 2726322 12/1977 Fed. Rep. of Germany ...... 340/134

*Primary Examiner*—James L. Rowland
*Assistant Examiner*—Brian R. Tumm
*Attorney, Agent, or Firm*—Michael I. Kroll

[57] ABSTRACT

A safety helmet to be worn by motorcyclists is provided which contains a backward facing warning light which shines when the motorcycle's brake pedal is depressed. To avoid using a wired connection between the motorcycle and the helmet a transmitter is attached to the motorcycle and a receiver which activates the light is installed inside the helmet. A transmitter encoder and a receiver decoder prevent spurious sources of radio frequency from activating the receiver. A code card is used to guarantee that both the encoder settings and the decoder switch settings are identical.

3 Claims, 1 Drawing Sheet

MOTORCYCLE HELMET CONTAINING AN AUTOMATIC BRAKE LIGHT

BACKGROUND OF THE INVENTION

The present invention relates generally to the field of visual safety warning devices and, more specifically, to warning lights for helmets warn by operators of motorcycles. Until now, motorcycle operators have been at a distinct disadvantage in that the existing brake lights, mounted to the rear fender of the motorcycle, are too close to the ground to be easily seen by the operator of a motor vehicle approaching the motorcycle from the rear. As a result there have been a number of rear-end collisions which have resulted in injuries, loss of life, and property damage. Besides the operator of the vehicle trailing directly behind the motorcycle, it is advantageous to the operators of vehicles behind the trailing vehicle to see that brakes have been applied by the motorcycle operator. Recently, governmental agencies have recognized this problem as it pertains to automobiles and have mandated the addition of a third brake light located at rear window level for newly built automobiles. No such solution is available to motorcycle operators, however, since there is no structure high enough on the motorcycle to provide a base for such an elevated brake light. The helmet worn by the operator is the only platform available for such an elevated warning light.

BACKGROUND OF THE PRIOR ART

A number of solutions have been suggested which involve the use of a helmet together with a light source. S. Campanell (U.S. Pat. No. 2,816,284) suggests a safety light assembly; J. Bosley, et. al. (U.S. Pat. No. 3,142,833) suggests a fireman's hat with siren and flashing light mounted thereon; O. McBride (U.S. Pat. No. 1,901,180) suggests an electric head lamp; and, D. Malm (U.S. Pat. No. 4,199,802) suggests a headgear with light. However, none of the above inventions provides any way of having a brake pedal on a motorcycle, or any other vehicle for that matter, control the light contained in the helmet.

SUMMARY OF THE INVENTION

It is, therefore, a primary object of the present invention to provide a safety helmet, which contains a backward facing light which can be seen by a trailing vehicle.

A further object is to provide a safety helmet which can be seen by vehicles behind the trailing vehicle.

A yet further object is to provide a safety helmet whose light is activated when the brake pedals of the motorcycle are depressed.

A still further object is to provide a safety helmet which uses a radio control link between the motorcycle and the helmet in order to obviate any need for a wired connection between the two.

A yet still further object is to provide a safety helmet which is coded so that only the transmitter attached to the motorcycle can activate the helmet's light and not some other nearby transmitter.

A still further object is to provide a safety helmet which can use an accessory code card to assist in matching the code settings of both the transmitter and the receiver, thereby guaranteeing compatibility between the two.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
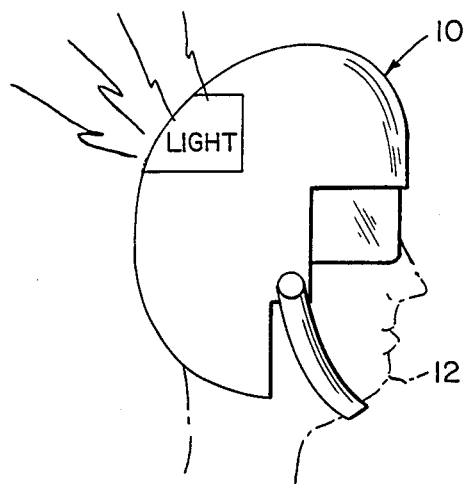
FIG. 1 is side view of the invention shown installed upon the head of a motorcycle operator.

In FIG. 1, the invention, a safety helmet 10, is shown installed upon the head 12 of a motorcycle operator.

Figure 2:
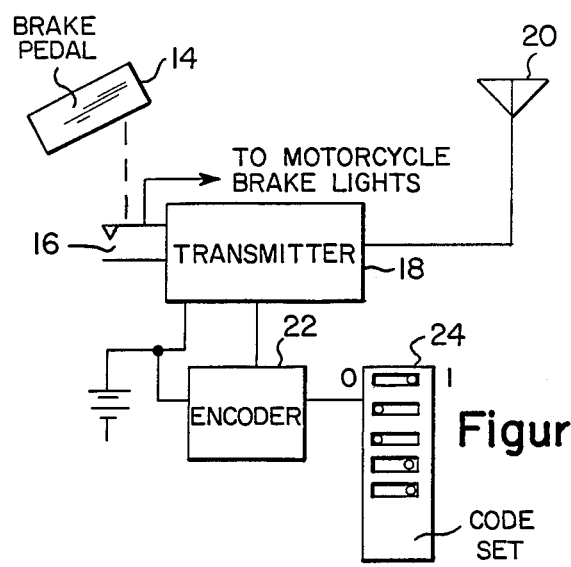
FIG. 2 is an electronic block diagram of the transmitter section of the invention which is installed onto a motorcycle.

The operation of the transmitter portion of the invention may best be understood with reference to FIG. 2. On a conventional motorcycle, when brake pedal 14 is depressed, closure of switch 16 causes the motorcycle's brake light to shine. Once the invention is installed, the closure of switch 16 also turns transmitter 18 on and causes a signal to be radiated from transmitting antenna 20, which might be the existing antenna used for other purposes or a separate antenna dedicated to this application. In order to prevent other radio frequency sources from triggering the invention an encoder 22 modulates transmitter 18 to produce an encoded signal which could typically be pulse coded, amplitude modulated or frequency modulated. The actual coding can be determined by the settings of binary encoder code set switch 24 by selecting from five pairs of 1's and 0's. Although five switch pairs are shown, any number of switches beyond two could be used. The transmitter circuitry described herein may typically be contained in an enclosure attached to the frame of the motorcycle.

Figure 3:
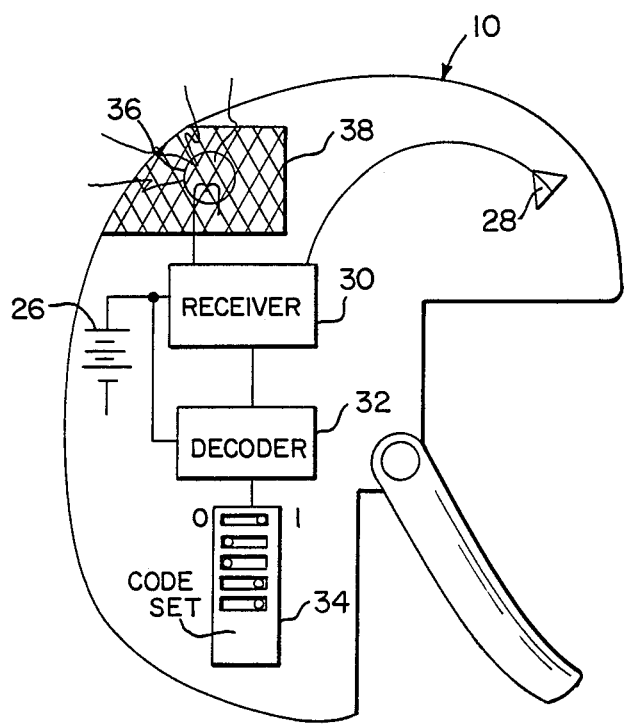
FIG. 3 is an electronic block diagram of the receiver section of the invention shown superimposed upon a side view of the helmet.

The operation of the receiver portion of the invention may best be understood with reference to FIG. 3. Note that all elements of the receiver are located inside helmet 10. The receiver components are powered by a power source, battery 26. A receiving antenna 28, embedded in helmet 10, intercepts signals radiated by transmitting antenna 20 and inputs them to receiver 30. Binary decoder code set switch 34 is set to the same settings as binary encoder code set switch 24. A decoder 32, demodulates and decodes the signal and if the code received matches the code determined by binary decoder code set switch 34 then light source 36 is activated. This light shines through typically red colored bezel 38. As soon as brake pedal 14 is released light source 36 is extinguished.

Figure 4:
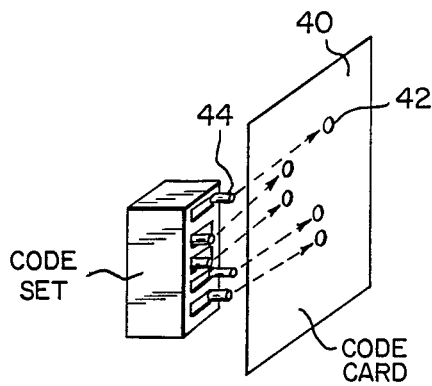
FIG. 4 is a perspective view of one of the code set switches of the invention shown with an accessory code card.

It is imperative that both binary encoder code set switch 24 and binary decoder code set switch 34 are set identically. As shown in FIG. 4, this can be assured by using an accessory code card 40 which is equipped with openings, typified by 42, which match protrusions, or activating switch levers, typified by 44. These switch levers 44 or extensions project from fixed bodies of the switch 24 and 34 and slide laterally with respect to the fixed bodies of the switches 24 and 34. Inserting all switch levers into their respective apertures in code card 40 assures that the set code will match the cards. The installation can be performed by using code card 40 first on one code set switch and then the other, or a matched pair of code cards could be prepared, each of which is permanently installed onto its respective code set switch thereby locking its code and preventing an accidental change in their respective settings.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A safety helmet, wearable by an operator of a motorycle having brake lights, a brake pedal, and a switch, comprising:
   (a) a protective helmet having a rear portion;
   (b) a light source located at said rear portion of said protective helmet;
   (c) an accessory transmitter attached to the motorcycle upon which the operator wearing said protective helment sits, said transmitter being connected to the existing switch which controls the existing motorcycle brake lights when pressure is exerted upon the motorcycle's brake pedal, said transmitter emitting a radio signal when the brake pedal is depressed;
   (d) a radio receiver located inside said protective helmet which upon receipt of said radio signal from said accessory transmitter turns on said light source and in the absence of said radio signal turns off said light source;
   (e) an electrical power source which provides power to said light source and said radio receiver;
   (f) an encoder having a code and being connected to said transmitter so that said radio signal of said transmitter is modulated with a coded signal;
   (g) a decoder having a code and being connected to said receiver allowing said coded signal of said transmitter to be decoded in such a way that said code of said decoder matches said code of said encoded signal of said transmitter so that said light source is activated when the pedal is depressed;
   (h) a binary encoder code set switch connected to said encoder;
   (i) a corresponding binary decoder set switch connected to said decoder so that identical codes are set for said switches, said binary switches having settings, fixed bodies, and movable contacts with extensions, said extensions sliding laterally with respect to said fixed bodies of said switches; and
   (j) an accessory code card having apertures through which said extensions of said switches are inserted locking said codes of said switches and preventing an accidental change in said settings of said switches.

2. A safety helmet as recited in claim 1; further comprising a receiving antenna disposed on the inside of the helment for capturing said coded signal and conducting said coded signal to said radio receiver.

3. A safety helmet as recited in claim 2; further comprising a transmitting antenna fitted to the motorcycle and connected to said transmitter so that said transmitting antenna radiates said coded signal from said transmitter to said receiving antenna.

* * * * *